US010891056B2

(12) United States Patent
Cordero et al.

(10) Patent No.: US 10,891,056 B2
(45) Date of Patent: Jan. 12, 2021

(54) VIRTUALIZATION OF MEMORY COMPUTE FUNCTIONALITY

(71) Applicant: INTERNATIONAL BUSINESS MACHINES CORPORATION, Armonk, NY (US)

(72) Inventors: Edgar Cordero, Round Rock, TX (US); Anand Haridass, Bangalore (IN); Arun Joseph, Bangalore (IN); Diyanesh B. C. Vidyapoornachary, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/398,576

(22) Filed: Apr. 30, 2019

(65) Prior Publication Data

US 2019/0258399 A1    Aug. 22, 2019

Related U.S. Application Data

(63) Continuation of application No. 15/334,504, filed on Oct. 26, 2016, now Pat. No. 10,346,050.

(51) Int. Cl.
*G06F 12/00* (2006.01)
*G06F 3/06* (2006.01)
(Continued)

(52) U.S. Cl.
CPC ............ *G06F 3/061* (2013.01); *G06F 3/0631* (2013.01); *G06F 3/0656* (2013.01);
(Continued)

(58) Field of Classification Search
CPC .......... G06F 3/061; G06F 3/0631; G06F 3/068
See application file for complete search history.

(56) References Cited

U.S. PATENT DOCUMENTS 8,359,451 B2   1/2013   Chen et al.
8,392,628 B2   3/2013   Santos et al.
(Continued)

OTHER PUBLICATIONS

Anonymously, "Application program code sharing across multiple guest operating systems in a virtualized environment", IPCOM000219085D; Jun. 19, 2012.
(Continued)

*Primary Examiner* — Gurtej Bansal
(74) *Attorney, Agent, or Firm* — Cantor Colburn LLP; Bryan Bortnick

(57) ABSTRACT

Systems, methods, and computer-readable media are disclosed for virtualizing memory compute function resources to improve resource utilization and system performance are disclosed. A virtualized hypervisor may be provided that is configured to instantiate a respective memory function controller of each memory controller present in a system/device. The virtualized hypervisor may be further configured to maintain the memory function controllers and their corresponding memory compute functionality as shareable resources that can be allocated to system components upon request. The virtualized hypervisor may allocate a memory function controller and its corresponding memory compute functionality to a system component, and may further provide the system component with an exclusive grant of memory compute pages that can be utilized by the allocated memory function controller to execute a memory compute function to perform one or more operations (e.g., one or more computations) on behalf of the system component.

17 Claims, 4 Drawing Sheets

(51) Int. Cl.
*G06F 9/455* (2018.01)
*G06F 12/109* (2016.01)
*G06F 9/445* (2018.01)

(52) U.S. Cl.
CPC .......... *G06F 3/0673* (2013.01); *G06F 9/445* (2013.01); *G06F 9/45533* (2013.01); *G06F 12/00* (2013.01); *G06F 12/109* (2013.01); *G06F 2212/1041* (2013.01)

(56) References Cited

U.S. PATENT DOCUMENTS

| | | |
|---|---|---|
| 9,244,710 B2 | 1/2016 | Bacher et al. |
| 9,348,759 B2 | 5/2016 | Arroyo et al. |
| 9,354,906 B1 | 5/2016 | Uchronski et al. |
| 2009/0094430 A1 | 4/2009 | Bergheaud |
| 2010/0274947 A1 | 10/2010 | Ohta et al. |
| 2013/0332676 A1 | 12/2013 | Kotla et al. |
| 2014/0040576 A1 | 2/2014 | Cordero et al. |
| 2015/0026807 A1 | 1/2015 | Lutas |
| 2015/0033002 A1 | 1/2015 | Cordero et al. |
| 2015/0199209 A1 | 7/2015 | Tsirkin |
| 2015/0312366 A1 | 10/2015 | Ben-Yehuda et al. |
| 2015/0381409 A1 | 12/2015 | Margalit et al. |
| 2016/0034294 A1 | 2/2016 | Christenson et al. |
| 2016/0077965 A1 | 3/2016 | Gaonkar et al. |
| 2016/0162316 A1 | 6/2016 | King |
| 2018/0113612 A1 | 4/2018 | Cordero et al. |

OTHER PUBLICATIONS

Anonymously, "Method of coalescing pages of source System and Seprating them in Target System in Concurrent Live Virtual Machine Movement." IPCOM000245198D; Feb. 18, 2016.

Brito, Allyson et al., "IBM Power VM Virtualization, Active Memory Sharing" [online]; [retrieved on Oct. 23, 2016]; retrieved from internet, http://www.redbooks.ibm.com/abstracts/redp4470.html?Open, 2 pgs.

IBM "List of IBM Patents or Patent Applications Treated as Related (Appendix P)"; Filed Apr. 30, 2019, 2 pages.

Venkatesan. Vimalraj et al., "Ex-Tmem: Extending Transcendent Memory with Non-volatile Memory for Virtual Machines", High Performance Computing and Communications, 2014 IEEE, IEEE Computer Society; pp. 966-973.

VIRTUALIZATION OF MEMORY COMPUTE FUNCTIONALITY

DOMESTIC PRIORITY

This application is a continuation of U.S. patent application Ser. No. 15/334,504, filed Oct. 26, 2016, the disclosure of which is incorporated by reference herein in its entirety.

BACKGROUND

In virtualized computing environments, physical memory of a computing system can be allocated to multiple logical partitions in a dedicated manner or in a shared manner. In a dedicated memory allocation scenario, a system administrator may manually issue a dynamic memory reconfiguration to cause unused memory from one logical partition to be reallocated to another logical partition that is being impacted by memory constraints. According to the shared memory allocation scheme, on the other hand, the system may automatically decide the optimal distribution of the physical memory to logical partitions and adjust the memory assignment based on demand for memory pages. While active memory sharing allows multiple logical partitions to share a common pool of physical memory, and thus, provides certain memory virtualization capabilities, it nonetheless suffers from a number of drawbacks. Discussed herein are technical solutions that address at least some of these drawbacks associated with existing solutions for active memory sharing.

SUMMARY

In one or more example embodiments of the disclosure, a method for managing allocation of memory compute functionality is disclosed. The method includes receiving, from a system component, a request for free memory pages, and allocating, by a virtualized hypervisor, resources of a memory function controller to the system component. The method further includes converting a group of free memory pages into a group of memory compute pages, and allocating, by the virtualized hypervisor, the group of memory compute pages for exclusive use by a memory compute function of the memory function controller to perform one or more operations on behalf of the system component.

In one or more other example embodiments of the disclosure, a system for managing the allocation of physical memory is disclosed. The system includes at least one memory storing computer-executable instructions and at least one processor configured to access the at least one memory and execute the computer-executable instructions to perform a set of operations. The operations include receiving, from a system component of the system, a request for free memory pages, and allocating, using a virtualized hypervisor, resources of a memory function controller to the system component. The set of operations further include converting a group of free memory pages into a group of memory compute pages, and allocating, using the virtualized hypervisor, the group of memory compute pages for exclusive use by a memory compute function of the memory function controller to perform one or more operations on behalf of the system component.

In one or more other example embodiments of the disclosure, a computer program product for managing the allocation of physical memory is disclosed that includes a non-transitory storage medium readable by a processing circuit, the storage medium storing instructions executable by the processing circuit to cause a method to be performed. The method includes receiving, from a system component, a request for free memory pages, and allocating, by a virtualized hypervisor, resources of a memory function controller to the system component. The method further includes converting a group of free memory pages into a group of memory compute pages, and allocating, by the virtualized hypervisor, the group of memory compute pages for exclusive use by a memory compute function of the memory function controller to perform one or more operations on behalf of the system component.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
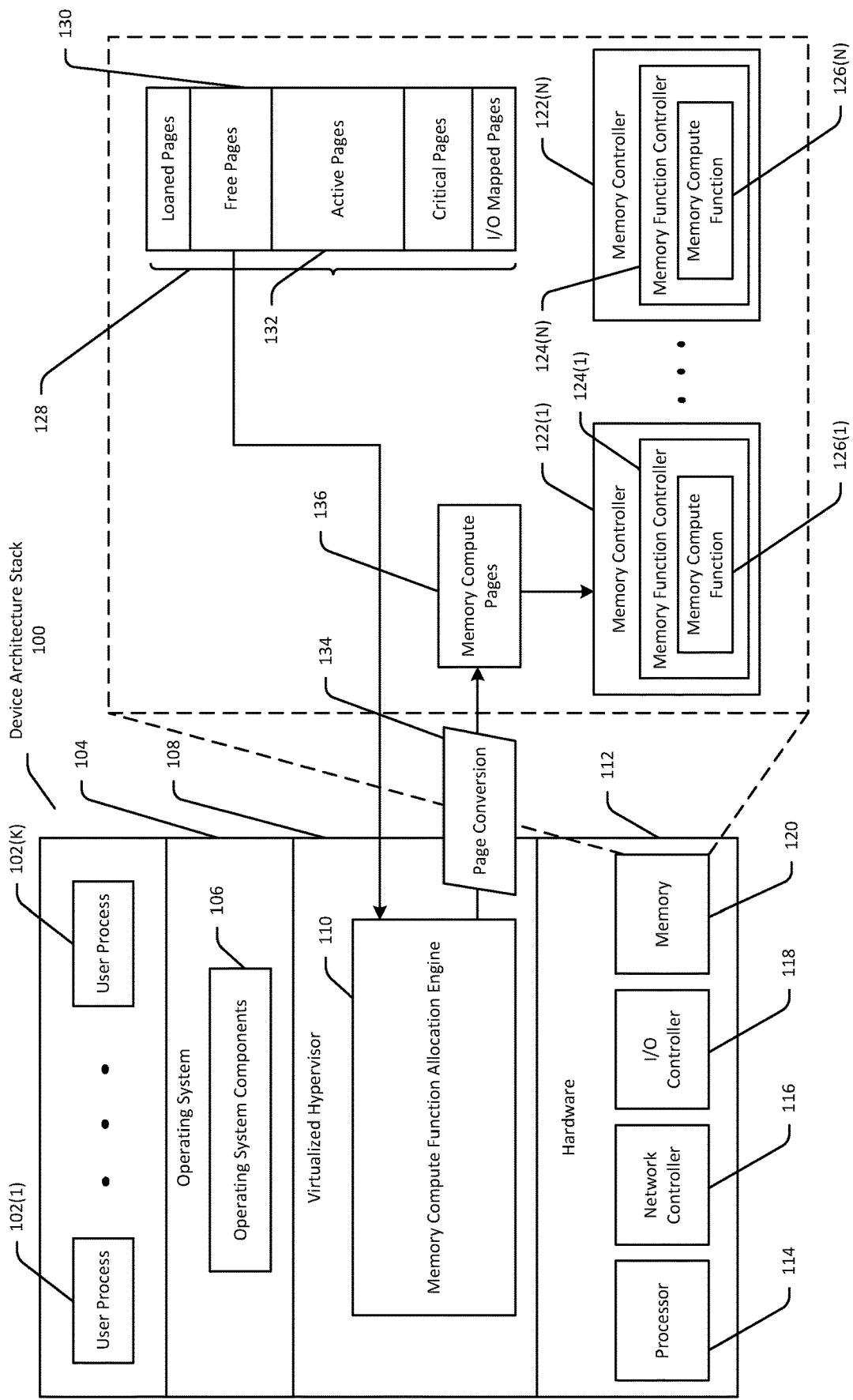
FIG. 1 is a block diagram depicting memory compute functionality virtualization in accordance with one or more example embodiments of the disclosure.

Example embodiments of the disclosure include, among other things, systems, methods, computer-readable media, techniques, and methodologies for virtualizing memory compute functionality to improve resource utilization and system performance. An illustrative computing system or device in accordance with example embodiments of the disclosure may include a virtualized hypervisor that is configured to instantiate a respective memory function controller of each memory controller present in the device. The virtualized hypervisor may be further configured to maintain the memory function controllers and their corresponding memory compute functionality as shareable resources that can be allocated to system components upon request. In particular, the virtualized hypervisor may allocate a memory function controller and its corresponding memory compute functionality to a system component, and may further provide the system component with an exclusive grant of memory compute pages that can be utilized by the allocated memory function controller to execute a memory compute function to perform one or more operations (e.g., one or more computations) on behalf of the system component. In this manner, a device processor may be relieved of computationally intensive tasks, thereby freeing the device processor up to perform other tasks. In addition, virtual machines may leverage virtualized memory compute functionality to interleave memory and processor operations concurrently to achieve optimal system/device performance.

As compared to dedicated memory allocation techniques, active memory sharing techniques are able to more effectively utilize unused memory resources by sharing a pool of memory resources among a group of logical partitions. Notwithstanding this, active memory sharing suffers from a number of drawbacks. For example, conventional active memory sharing techniques lack the capability to execute memory compute functionality on acquired memory pages. A technique of providing a memory function controller that is configured to capture and acquire memory pages for use, for example, by a system component other than a device processor to perform one or more computational tasks allows for some reduction in the computational load on the device processor. However, because the memory function controller is tasked with requesting, accessing, and releasing memory pages in this technique, usage of memory compute functions at the memory controller level is limited. Example embodiments of the disclosure address this drawback by virtualizing memory compute resources using a virtualized hypervisor such that the allocation of memory compute resources is handled by the virtualized hypervisor, thereby significantly expanding the amount of memory function computing that can be handled by the memory function controller, and thus, further reducing the computational load on a device processor and improving memory resource usage balancing between the device processor computing and the memory function computing.

In addition, in many conventional computer memory arrangements, a memory controller facilitates processor and input/output (I/O) access to memory resources, but does not directly memory content because the memory is owned and managed by system hypervisor software that controls how memory is allocated among operating system (O/S) instances. In particular, in many conventional computer memory arrangements, during system startup, a memory controller may initialize memory settings, calibrate the interface, and perform memory accesses for testing purposes. Once this initialization is complete, the memory controller surrenders control of the memory usage to the system software hypervisor and/or the O/S, and thus, at that point, can no longer affect memory content. While a memory controller containing a memory function controller that is provided with permanent or temporary shared or exclusive ownership of regions of memory during system operation yields some degree of improved computational efficiency over these other conventional memory arrangements, the virtualization of memory compute resources provided in example embodiments of the disclosure frees up the memory function controllers for memory function computing, and thus, yields even greater computational efficiency gains.

Figure 2:
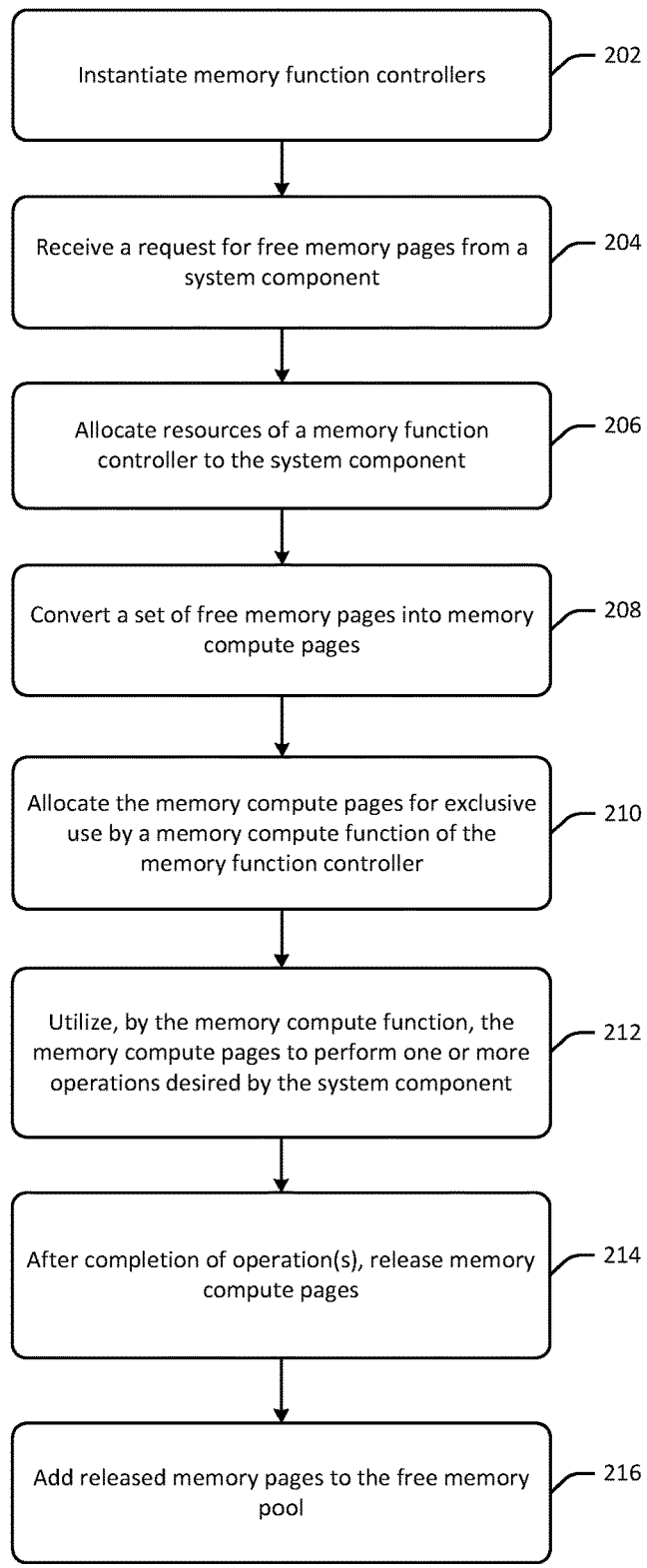
FIG. 2 is a process flow diagram of an illustrative method for allocating memory compute resources using a memory compute function allocation engine in accordance with one or more example embodiments of the disclosure.
Figure 3:
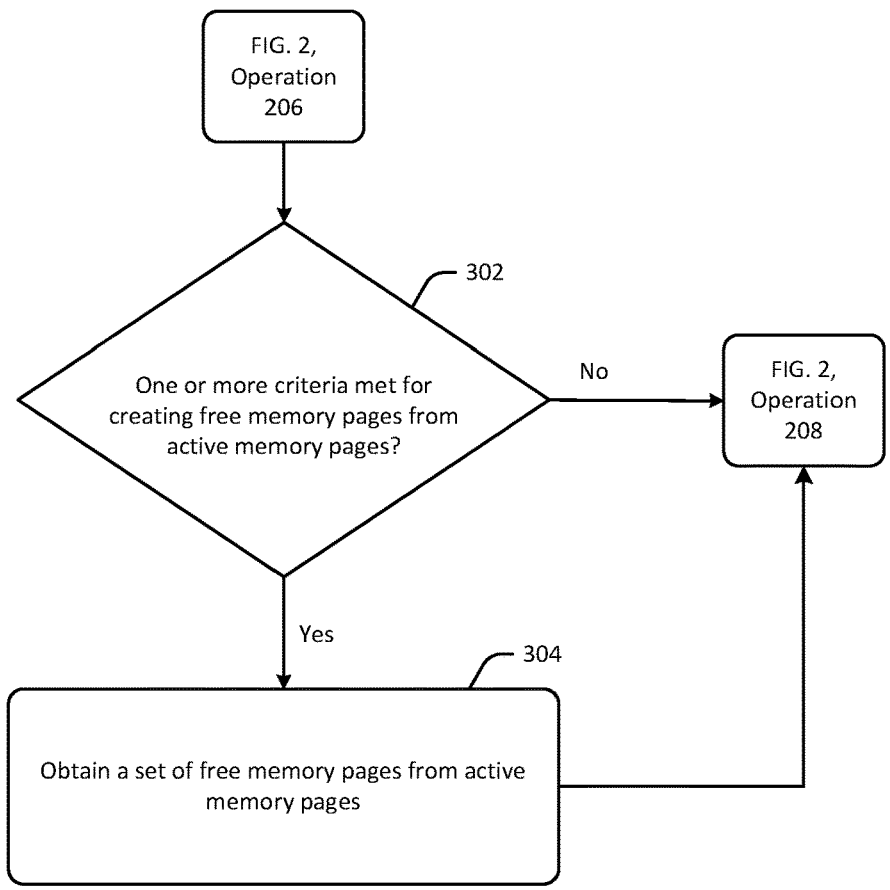
FIG. 3 is a process flow diagram of an alternative illustrative method for allocating memory compute resources using a memory compute function allocation engine in accordance with one or more example embodiments of the disclosure.

FIG. 1 is a block diagram depicting memory compute functionality virtualization in accordance with one or more example embodiments of the disclosure. FIG. 2 is a process flow diagram of an illustrative method 200 for allocating memory compute resources using a memory compute function allocation engine in accordance with one or more example embodiments of the disclosure. FIG. 3 is a process flow diagram of an alternative illustrative method 300 for allocating memory compute resources using a memory compute function allocation engine in accordance with one or more example embodiments of the disclosure. FIGS. 2 and 3 will each be described in conjunction with FIG. 1 at times hereinafter.

Each operation of the method 200 and/or the method 300 may be performed by one or more components depicted in FIG. 1 such as, for example, a virtualized hypervisor, a memory function controller, and so forth. These component(s) may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring first to FIG. 1, a device architecture stack 100 is depicted. The device architecture stack 100 may include one or more user processes 102(1)-102(K) and an operating system (O/S) 104 that contains one or more O/S components 106. The O/S components may include, for example, device drivers, services, a kernel, or the like. The device architecture stack 100 may further include a virtualized hypervisor 108 which may contain a memory compute function allocation engine 110 configured to allocate memory compute resources among system components, as will be described in more detail later in this disclosure. In addition, the device architecture stack 100 may include various hardware components 112 including, without limitation, one or more processors 114 (e.g., a central processing unit (CPU)), one or more network controllers 116, one or more input/output (I/O) controllers, and physical memory 120. The hardware components 112 may include any of the types of hardware components described later in this disclosure in reference to FIG. 4. In certain example embodiments, multiple instances of the O/S 106 may be provided, where each such O/S instance may correspond to a respective virtual machine. While not depicted in FIG. 1, it should be appreciated that the device 100 may further include any number of additional hardware and software components.

FIG. 1 also depicts example components of the memory 120. The memory 120 may include, without limitation, one or more memory controllers 122(1)-122(N). Each of the memory controller(s) 122(1)-122(N) may include a respective one of memory function controller(s) 124(1)-124(N). Further, each of the memory function controller(s) 124(1)-124(N) may include a respective one of memory compute function(s) 126(1)-126(N). Any particular memory controller, memory function controller, and memory compute function may be referred to generically herein using reference numerals 122, 124, and 126. When executed, a memory compute function may cause one or more operations (e.g., one or more computations) to be performed which may include, without limitation, testing, calibrating, tracing, caching, computing, transforming, encrypting, decrypting, prefetching, predecoding, compressing, decompressing, remapping, mirroring, shadowing, or the like. It should be appreciated that, in certain example embodiments, a memory controller 122 may include multiple memory function controllers 124, and a memory function controller 124 may include or otherwise be configured to execute multiple memory compute functions 126.

Referring now to FIGS. 1 and 2 in conjunction with one another, at block 202, the virtualized hypervisor 108 may instantiate memory function controllers 124(1)-124(N) (or some subset thereof) and maintain the instantiated memory function controllers as shareable resources to enable virtualization of their corresponding memory function computing capabilities.

At block 204, the virtualized hypervisor 108 may receive a request for free memory pages from a system component. The system component may be a user process of user process(es) 102(1)-102(K), an operating system component 106, or a hardware component such as the network controller 116 or I/O controller 118.

At block 206, computer-executable instructions of the memory compute function allocation engine 110 may be executed to allocate resources of a memory function controller 124 to the system component. For ease of explanation, it will be assumed that the memory compute function allocation engine 110 allocates the resources of memory function controller 124(1) to the system component.

At block 208, computer-executable instructions of the memory compute function allocation engine 110 may be executed to convert 134 a set of free memory pages into memory compute pages 136. More specifically, the memory 120 may store a set of memory pages 128 that may include a variety of different types of memory pages (e.g., memory pages in different states of use). The memory pages 128 may include, for example, free memory pages 130 that are not currently being utilized by any system component or that are available for use. The memory compute function allocation engine 110 may identify some subset of the available free memory pages 130 for conversion 134 into memory compute pages 136. The memory pages 128 may further include active memory pages 132 that are currently being utilized by a system component as part of the execution of one or more tasks. In addition, the memory pages 128 may include, without limitation, loaned memory pages, critical memory pages, and I/O mapped memory pages.

At block 210, computer-executable instructions of the memory compute function allocation engine 110 may be executed to allocate the memory compute pages 136 for exclusive use by the memory compute function 126(1) of the memory function controller 124(1). More specifically, the memory compute pages 136 may be exclusively allocated to the memory function controller 124(1) for use in executing the memory compute function 126(1).

At block 212, the memory function controller 124(1) may cause the memory compute function 126(1) to be executed using the allocated memory compute pages 136 to perform one or more operations desired by the system component. The operation(s) may include, for example, any of those previously described. By executing the memory compute function 126(1) to perform operation(s) on behalf of the system component, the computational load on a device processor that would otherwise have executed the operation(s) is reduced.

At block 214, after the memory compute function 126(1) completes execution (e.g., after the operation(s) have been performed on behalf of the system component), the memory function controller 124(1) may release the memory compute pages 136 back to the virtualized hypervisor 108 (or more specifically the memory compute function allocation engine 110). Then, at block 216, the memory function allocation engine 110 may return the released memory compute pages 136 to the pool of free memory 130. In certain example embodiments, the memory function allocation engine 110 may convert the memory compute pages 136 back to free memory pages prior to returning them to the pool of free memory pages 130.

As previously described, FIG. 3 is a process flow diagram of an alternative illustrative method 300 for allocating memory compute resources using a memory compute function allocation engine. In particular, the method 300 of FIG. 3 may be performed in example embodiments of the disclosure in which free memory pages are obtained from active memory pages to satisfy the request for free memory received from a system component.

Referring to FIGS. 1 and 3 in conjunction with one another, block 302 may be performed following the operation at block 206 of the method 200 depicted in FIG. 2. At block 302, the memory compute function allocation engine 110 may evaluate one or more criteria to determine whether free memory pages should be obtained from some subset of the active memory pages 132. In certain example embodiments, the criteria may relate to an execution priority associated with the requesting system component. For example, if an execution priority associated with the requesting system component is higher than a priority associated with another system component utilizing one or more active memory pages, then a positive determination may be made at block 302. As another non-limiting example, the criteria evaluated at block 302 may relate to overall system/device performance. For example, a positive determination may be made at block 302 if the memory compute function allocation engine 110 determines that creating free memory pages from some subset of the active memory pages 132 would cause less than a threshold degradation in system performance. It should be appreciated that the above-described criteria is merely illustrative and not exhaustive.

In response to a positive determination at block 302, the memory compute function allocation engine 110 may create a set of free memory pages from some subset of the active memory pages 132, at block 304. From block 304, the method may proceed from block 208 of the method 200 of FIG. 4, and the free memory pages created from the active memory pages may be converted into memory compute pages 136. On the other hand, in response to a negative determination at block 302, the method may also proceed from block 208 of the method 200 of FIG. 4, but the free memory pages may be obtained from the pool of free memory pages 128 rather than from any of the active memory pages 132.

Example embodiments of the disclosure provide various technical features, technical effects, and/or improvements to technology. For instance, example embodiments of the disclosure provide the technical effects of improving memory resource utilization and system performance and reducing the computational load on system/device processors by shifting at least a portion of that computational load to memory function computing. These technical effects are achieved by at least in part by the technical feature of providing a virtualized hypervisor that is configured to instantiate memory function controllers and maintain the memory function controllers and their corresponding memory compute functionality as shareable resources that can be allocated to system components to perform memory function computing on behalf of the system components. These technical effects are further achieved at least in part by the technical feature of converting free memory pages to memory compute pages and allocating the memory compute pages to a memory function controller that executes a memory compute function using the memory compute pages to cause one or more operations to be performed on behalf of a system component. The technical effects of improving memory resource utilization and system performance and reducing the computational load on system/device processors constitutes an improvement to the functioning of a computer. It should be appreciated that the above examples of technical features, technical effects, and improvements to the functioning of a computer and computer technology provided by example embodiments of the disclosure are merely illustrative and not exhaustive.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
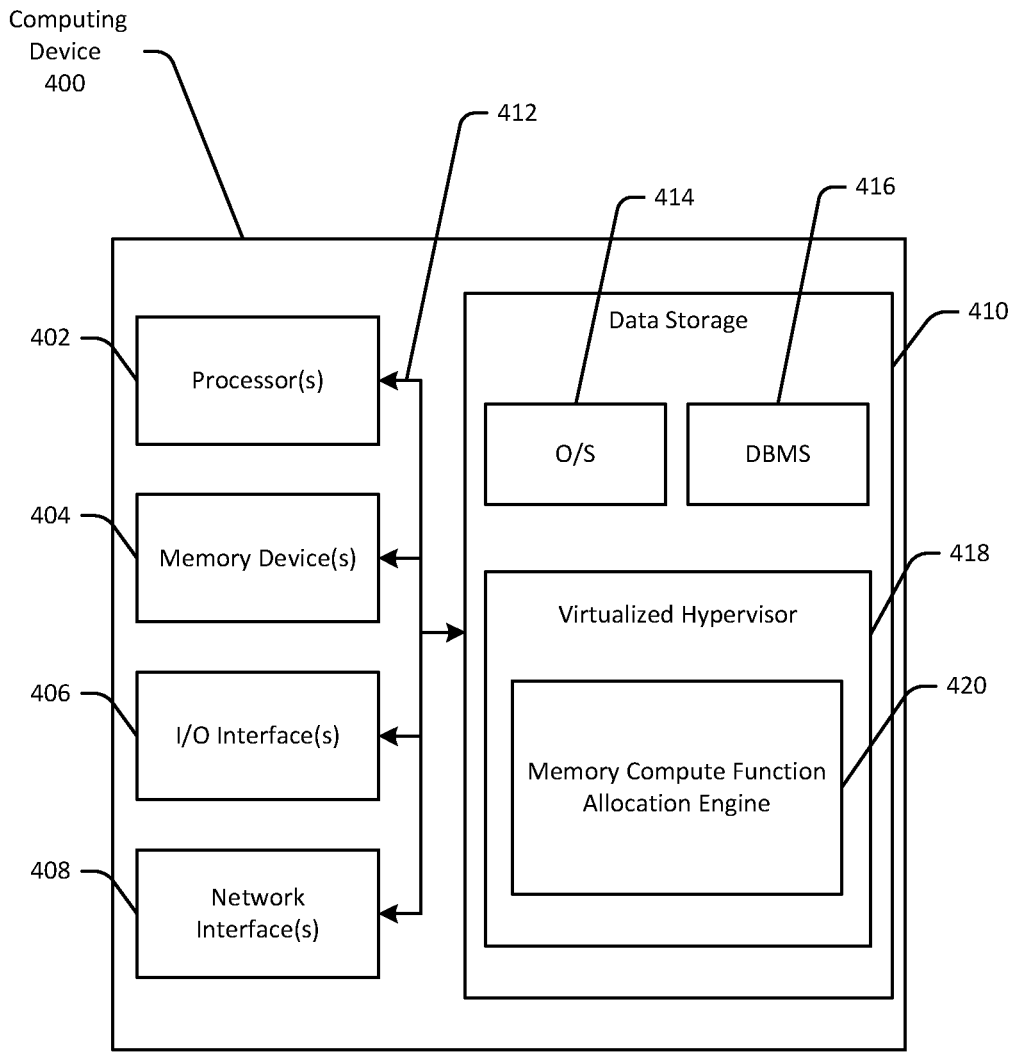
FIG. 4 is a schematic diagram of an illustrative computing device configured to implement one or more example embodiments of the disclosure.

FIG. 4 is a schematic diagram of an illustrative computing device 400 configured to implement one or more example embodiments of the disclosure. The device architecture stack 100 depicted in FIG. 1 may correspond to an illustrative configuration of the computing device 400. While the device 400 may be described herein in the singular, it should be appreciated that multiple instances of the device 400 may be provided, and functionality described in connection with the device 400 may be distributed across such multiple instances.

In an illustrative configuration, the device 400 may include one or more processors (processor(s)) 402, one or more memory devices 404 (generically referred to herein as memory 404), one or more input/output ("I/O") interface(s) 406, one or more network interfaces 408, and data storage 410. The device 400 may further include one or more buses 412 that functionally couple various components of the device 400.

The bus(es) 412 may include at least one of a system bus, a memory bus, an address bus, or a message bus, and may permit the exchange of information (e.g., data (including computer-executable code), signaling, etc.) between various components of the device 400. The bus(es) 412 may include, without limitation, a memory bus or a memory controller, a peripheral bus, an accelerated graphics port, and so forth. The bus(es) 412 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 404 may represent the physical memory 102 depicted in FIG. 1 and may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 410 may include removable storage and/or non-removable storage including, but not limited to, magnetic storage, optical disk storage, and/or tape storage. The data storage 410 may provide non-volatile storage of computer-executable instructions and other data. The memory 404 and the data storage 410, removable and/or non-removable, are examples of computer-readable storage media (CRSM) as that term is used herein.

The data storage 410 may store computer-executable code, instructions, or the like that may be loadable into the memory 404 and executable by the processor(s) 402 to cause the processor(s) 402 to perform or initiate various operations. The data storage 410 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404 and may ultimately be copied to data storage 410 for non-volatile storage.

More specifically, the data storage 410 may store one or more operating systems (O/S) 414 (which may include the O/S 104 and which may include one or more virtual O/S instances); one or more database management systems (DBMS) 416 configured to access the memory 404 and/or one or more external data store(s) (not shown); and one or more program modules, applications, engines, computer-executable code, scripts, or the like such as, for example, a virtualized hypervisor 418 and a memory compute function allocation engine 420. Any of the components depicted as being stored in data storage 410 may include any combination of software, firmware, and/or hardware. The software and/or firmware may include computer-executable instructions (e.g., computer-executable program code) that may be loaded into the memory 404 for execution by one or more of the processor(s) 402 to perform any of the operations described earlier in connection with correspondingly named modules.

Although not depicted in FIG. 4, the data storage 410 may further store various types of data utilized by components of the device 400 (e.g., memory compute functions 126(1)-126(N); memory pages 128; etc.). Any data stored in the data storage 410 may be loaded into the memory 404 for use by the processor(s) 402 in executing computer-executable instructions. In addition, any data stored in the data storage 410 may potentially be stored in external data store(s) and may be accessed via the DBMS 416 and loaded in the memory 404 for use by the processor(s) 402 in executing computer-executable instructions.

The processor(s) 402 may be configured to access the memory 404 and execute computer-executable instructions loaded therein. For example, the processor(s) 402 may be configured to execute computer-executable instructions of the various program modules, applications, engines, or the like of the device 400 to cause or facilitate various operations to be performed in accordance with one or more embodiments of the disclosure. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to other illustrative components depicted as being stored in the data storage 410, the O/S 414 may be loaded from the data storage 410 into the memory 404 and may provide an interface between other application software executing on the device 400 and hardware resources of the device 400. More specifically, the O/S 414 may include a set of computer-executable instructions for managing hardware resources of the device 400 and for providing common services to other application programs (e.g., process(es) 102(1)-102(K)). In certain example embodiments, the O/S 414 may include or otherwise control execution of one or more of the program modules depicted as being stored in the data storage 410. The O/S 414 may include any operating system now known or which may be developed in the future including, but not limited to, any server operating system, any mainframe operating system, or any other proprietary or non-proprietary operating system.

The DBMS 416 may be loaded into the memory 404 and may support functionality for accessing, retrieving, storing, and/or manipulating data stored in the memory 404, data stored in the data storage 410, and/or data stored in external data store(s). The DBMS 416 may use any of a variety of database models (e.g., relational model, object model, etc.) and may support any of a variety of query languages. The DBMS 416 may access data represented in one or more data schemas and stored in any suitable data repository. External data store(s) that may be accessible by the device 400 via the DBMS 416 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the device 400, the input/output (I/O) interface(s) 406 may facilitate the receipt of input information by the device 400 from one or more I/O devices as well as the output of information from the device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 400 or may be separate. The I/O devices may further include, for example, any number of peripheral devices such as data storage devices, printing devices, and so forth.

The I/O interface(s) 406 may also include an interface for an external peripheral device connection such as universal serial bus (USB), FireWire, Thunderbolt, Ethernet port or other connection protocol that may connect to one or more networks. The I/O interface(s) 406 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 400 may further include one or more network interfaces 408 via which the device 400 may communicate with any of a variety of other systems, platforms, networks, devices, and so forth. The network interface(s) 408 may enable communication, for example, with one or more other devices via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules depicted in FIG. 4 as being stored in the data storage 410 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the device 400 and/or hosted on other computing device(s) accessible via one or more networks, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of devices 400 in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the device 400 may include alternate and/or additional hardware, software, or firmware components beyond those described or depicted without departing from the scope of the disclosure. More particularly, it should be appreciated that software, firmware, or hardware components depicted as forming part of the device 400 are merely illustrative and that some components may not be present or additional components may be provided in various embodiments. While various illustrative modules have been depicted and described as software modules stored in data storage 410, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 or the method 300 may be performed by a device 400 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method of FIG. 2 or the illustrative method of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 or FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing allocation of memory compute functionality, the method comprising:
   receiving, from a first system component of a plurality of system components, a request for free memory pages that are not currently being used by any of the plurality of system components, wherein the plurality of system components further comprises a second system component and a third system component, wherein a priority associated with the first system component is higher than a priority associated with the second system component, and the priority associated with the second system component is higher than a priority associated with the third system component;
   allocating, by a virtualized hypervisor, resources of a memory function controller to the first system component;
   determining that one or more first criteria are not met for obtaining a group of free memory pages from a group of active memory pages, wherein at least a portion of the group of active memory pages are currently being utilized by the second system component, and the one or more first criteria include a predicted impact to system performance of allocating the group of free memory pages to the first system component;
   receiving, from the third system component, a second request for the free memory pages, wherein the second request is received after receiving the first request;
   allocating, by the virtualized hypervisor, the resources of the memory function controller to the third system component;
   determining that the one or more second criteria are met for obtaining the group of free memory pages from the group of active memory pages, the one or more second criteria including a predicted impact to system performance of allocating the group of free memory pages to the third system component;
   obtaining the group of free memory pages from the group of active memory pages, the obtaining comprising moving memory pages from the group of active memory pages into the group of free memory pages;
   converting the group of free memory pages into a group of memory compute pages; and
   allocating, by the virtualized hypervisor, the group of memory compute pages for exclusive use by a memory compute function of the memory function controller to execute one or more operations on behalf of the third system component.

2. The computer-implemented method of claim 1, wherein determining that the one or more first criteria are not met comprises:
   determining that obtaining the group of free memory pages for allocation to the first system component from the group of active memory pages would result in more than a threshold degradation in system performance.

3. The computer-implemented method of claim 1, wherein determining that the one or more second criteria are met comprises:
   determining that obtaining the group of free memory pages for allocation to the third system component from the group of active memory pages would result in less than a threshold degradation in system performance.

4. The computer-implemented method of claim 1, further comprising:
allocating, by the virtualized hypervisor, the resources of the memory function controller to a fourth system component,
wherein the third system component and the fourth system component utilize the memory compute function of the memory function controller according to a time-sharing protocol.

5. The computer-implemented method of claim 1, further comprising:
executing the memory compute function to perform the one or more operations on behalf of the third system component using the group of memory compute pages; and
releasing the group of memory compute pages to the virtualized hypervisor after the one or more operations are performed.

6. The computer-implemented method of claim 5, further comprising:
adding the released group of memory compute pages to a pool of available memory pages.

7. A system for managing allocation of memory compute functionality, the system comprising:
at least one memory storing computer-executable instructions; and
at least one processor configured to access the at least one memory and execute the computer-executable instructions to:
receive, from a first system component of a plurality of system components of the system, a request for free memory pages that are not currently being used by any of the plurality of system components, wherein the plurality of system components further comprises a second system component and a third system component, wherein a priority associated with the first system component is higher than a priority associated with the second system component, and the priority associated with the second system component is higher than a priority associated with the third system component;
allocate, using a virtualized hypervisor, resources of a memory function controller to the first system component;
determine that one or more first criteria are not met for obtaining a group of free memory pages from a group of active memory pages, wherein at least a portion of the group of active memory pages are currently being utilized by the second system component, and the one or more first criteria include a predicted impact to system performance of allocating the group of free memory pages to the first system component;
receive, from the third system component, a second request for the free memory pages, wherein the second request is received after receiving the first request;
allocate, by the virtualized hypervisor, the resources of the memory function controller to the third system component;
determine that the one or more second criteria are met for obtaining the group of free memory pages from the group of active memory pages, the one or more second criteria including an impact to system performance of allocating the group of free memory pages to the third system component;
obtaining the group of free memory pages from the group of active memory pages, the obtaining comprising moving memory pages from the group of active memory pages into the group of free memory pages;
convert the group of free memory pages into a group of memory compute pages; and
allocate, using the virtualized hypervisor, the group of memory compute pages for exclusive use by a memory compute function of the memory function controller to execute one or more operations on behalf of the third system component.

8. The system of claim 7, wherein the at least one processor is further configured to execute the computer-executable instructions to:
allocate, using the virtualized hypervisor, the resources of the memory function controller to a fourth system component,
wherein the third system component and the fourth system component utilize the memory compute function of the memory function controller according to a time-sharing protocol.

9. The system of claim 7, wherein the at least one processor is configured to determine that the one or more first criteria are not met by executing the computer-executable instructions to:
determine that obtaining the group of free memory pages for allocation to the first system component from the group of active memory pages would result in more than a threshold degradation in system performance.

10. The system of claim 7, wherein the at least one processor is configured to determine that the one or more second criteria are met by executing the computer-executable instructions to:
determine that obtaining the group of free memory pages for allocation to the third system component from the group of active memory pages would result in less than a threshold degradation in system performance.

11. The system of claim 7, wherein the at least one processor is further configured to execute the computer-executable instructions to:
execute the memory compute function to perform the one or more operations on behalf of the third system component using the group of memory compute pages; and
release the group of memory compute pages to the virtualized hypervisor after the one or more operations are performed.

12. The system of claim 11, wherein the at least one processor is further configured to execute the computer-executable instructions to:
add the released group of memory compute pages to a pool of available memory pages.

13. A computer program product for managing allocation of memory compute functionality, the computer program product comprising a non-transitory storage medium readable by a processing circuit, the storage medium storing instructions executable by the processing circuit to cause a method to be performed, the method comprising:
receiving, from a first system component of a plurality of system components, a request for free memory pages that are not currently being used by any of the plurality of system components, wherein the plurality of system components further comprises a second system component and a third system component, wherein a priority associated with the first system component is higher than a priority associated with the second system component, and the priority associated with the second system component is higher than a priority associated with the third system component;

allocating, using a virtualized hypervisor, resources of a memory function controller to the first system component;

determining that one or more first criteria are not met for obtaining a group of free memory pages from a group of active memory pages, wherein at least a portion of the group of active memory pages are currently being utilized by the second system component, and the one or more first criteria include an impact to system performance of allocating the group of free memory pages to the first system component;

receiving, from the third system component, a second request for the free memory pages, wherein the second request is received after receiving the first request;

allocating, by the virtualized hypervisor, the resources of the memory function controller to the third system component;

determining that the one or more second criteria are met for obtaining the group of free memory pages from the group of active memory pages, the one or more second criteria include an impact to system performance of allocating the group of free memory pages to the third system component;

obtaining the group of free memory pages from the group of active memory pages, the obtaining comprising moving memory pages from the group of active memory pages into the group of free memory pages;

converting the group of free memory pages into a group of memory compute pages; and allocating, using the virtualized hypervisor, the group of memory compute pages for exclusive use by a memory compute function of the memory function controller to execute one or more operations on behalf of the third system component.

14. The computer program product of claim 13, wherein determining that the one or more first criteria are not met comprises:

determining that obtaining the group of free memory pages for allocation to the first system component from the group of active memory pages would result in more than a threshold degradation in system performance.

15. The computer program product of claim 13, wherein determining that the one or more second criteria are met comprises:

determining that obtaining the group of free memory pages for allocation to the third system component from the group of active memory pages would result in less than a threshold degradation in system performance.

16. The computer program product of claim 13, the method further comprising:

executing the memory compute function to perform the one or more operations on behalf of the third system component using the group of memory compute pages; and releasing the group of memory compute pages to the virtualized hypervisor after the one or more operations are performed.

17. The computer program product of claim 16, the method further comprising:

adding the released group of memory compute pages to a pool of available memory pages.

* * * * *